United States Patent Office 2,743,715
Patented May 1, 1956

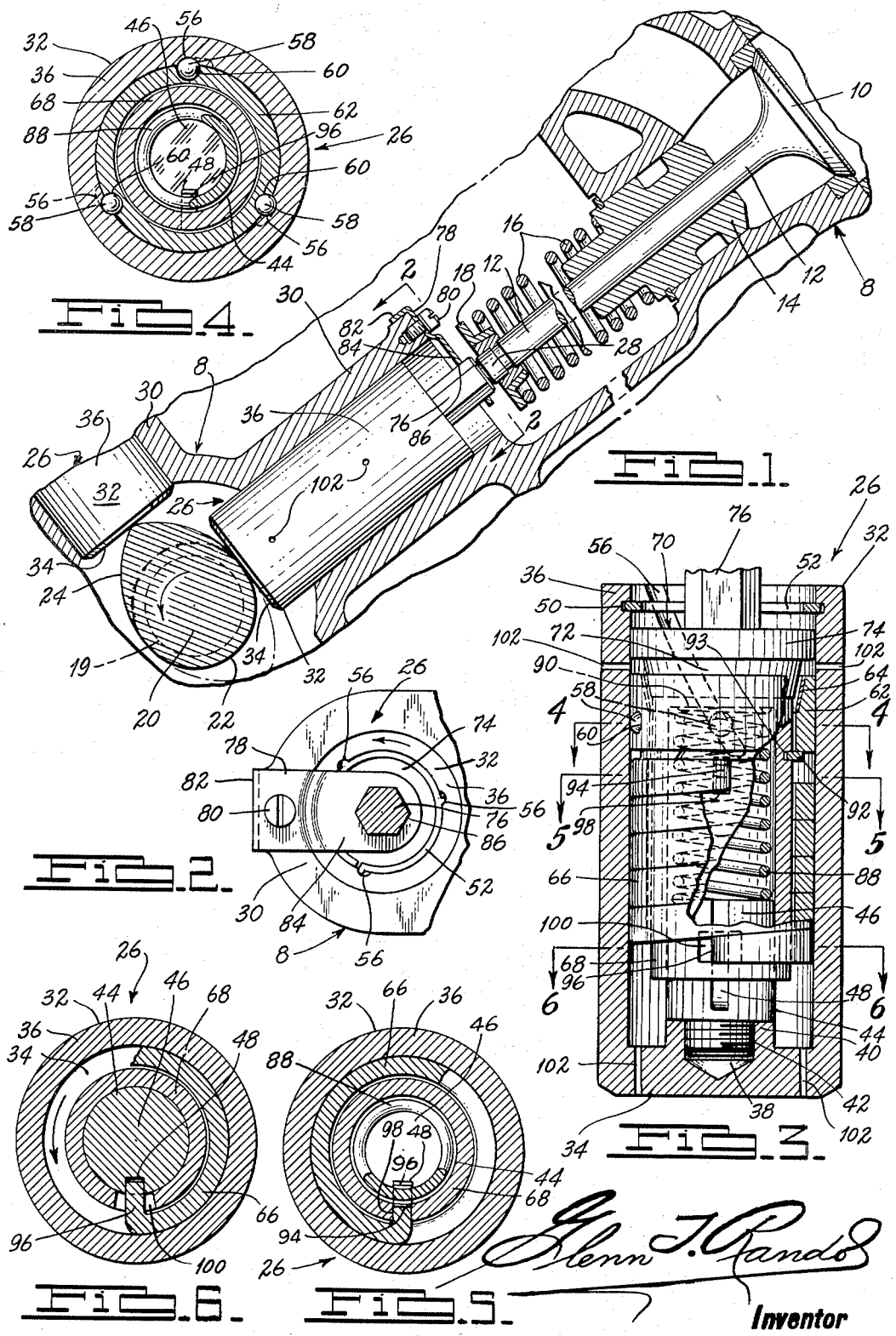

2,743,715

MECHANICAL SELF-ADJUSTING VALVE LIFTER

Glenn T. Randol, Mountain Lake Park, Md.

Application March 23, 1953, Serial No. 344,077

20 Claims. (Cl. 123—90)

The present invention relates to a novel and improved self-adjusting valve lifter or tappet of the mechanical type for incorporation in a conventional internal-combustion engine.

Broadly, the invention concerns a novel mechanical valve lifter unit or assembly, interposed between the end of the valve stem and the camshaft of the engine and adapted to instantaneously compensate for or take up substantially any backlash which may develop or exist in the valve actuating mechanism over and above a requisite operating clearance defined by relative movement between the two principal elements comprising the said assembly, without affecting the latter clearance operative condition during valve closed engine operations.

An object importantly related to the object immediately preceding is to provide such a mechanical valve tappet with relatively movable outer and inner body members having inter-connecting mechanism for producing limited relative movement of helical configuration therebetween; a precompressed spring for biasing said members apart; and resilient means interconnecting said members in normally unstressed status and deformable under tension responsive to said helical movement for frictionally locking said members together for conjoint movement to open and close a selected engine valve.

More particularly, my invention provides a mechanical valve lifter in the form of a compact self-contained unit; which is actuated by a cam on the engine camshaft; which is reciprocably mounted in a cylinder portion of the engine for effecting the opening and subsequent closing of a valve once during each revolution of the camshaft; which includes an axially movable but non-rotatable plunger member terminating at its upper end in a valve stem engaging portion; which includes a compression spring for automatically adjusting the plunger disposition relatively to the valve stem responsive to changes in the thermal condition of the engine or to compensate for wear of the parts, and for automatically eliminating any backlash that may develop in the valve-operating train over and above an established or predetermined operational clearance; which includes a helically wound coil spring the upper end of which is anchored to a segment of said plunger, and the lower end of which is operatively anchored to a plug element rigid with a cup-shaped piston member of the unit, said spring being expansible in response to minute relative spiral movements of the piston member with respect to the plunger in one direction, and contractible to normal status in response to minute relative movements in the opposite direction; which includes means for effecting the intermittent expansion and contraction of said helical spring as the lifter unit is reciprocated during each revolution of the camshaft; and which includes in addition to those recited, other cooperating elements and inter-related structure and mechanism adapted to attain the hereinafter presented objectives of my invention in a highly efficient manner, and in noiseless fashion.

The principal object of the invention is to provide for incorporation in a conventional internal-combustion engine, a novel and improved valve lifter unit or assembly which is mechanically operable; which is automatically adjustable to compensate for undesirable backlash which may develop during engine operations in consequence of wear or as a result of changes in the thermal condition of the engine; and which is adapted when actuated by a cam on the camshaft, to intermittently effect the cyclic opening and closing of a conventional engine poppet valve.

It is another object of this invention to provide an automatically adjustable, mechanically operable valve lifter assembly in the form of a novel self-contained unit for disposition between the camshaft and the extremity of the operating stem of a conventional poppet valve.

A further object is to provide in the present valve lifter a plunger member slidably mounted in a cup-shaped piston, and spring-biased into constant contact with the extremity of a conventional valve stem irrespective of engine thermal conditions, and irrespective of whether the valve is in open, closed, or intermediate positions.

Another object is to provide a lifter unit including a helically closely wound coil spring the one end of which is anchored to said plunger, and the other end of which is anchored to a plug rigid with said piston member, and means for expanding said coil spring to couple the plunger and piston for upward movement in unison immediately subsequent to an initial relative helical movement of said piston.

A novel feature of the invention resides in the provision of a clutch sleeve having a circularly spaced series of spherical elements partially embedded therein, said elements being adapted in cooperation with angularly disposed raceways formed in the inner cylindrical surface of the lifter piston member to operate said sleeve into engagement with a complementary clutch segment integral with the aforesaid plunger, simultaneously with the initially cam-induced spiral movement of said piston member.

The invention further provides means for normally maintaining the said clutch sleeve in a predetermined disengaged disposition relative to the clutch segment of the plunger member, said means comprising a split retainer ring that is carried by said plunger member, and that further serves to distribute thrust forces in the course of valve opening operations.

The invention also provides means for accommodating reciprocal, but prohibiting rotational movements of the plunger member, as will appear.

Additional objects, features, and inherent advantages will be referred to in the course of the detailed description to follow with reference to the accompanying drawing wherein is illustrated the preferred embodiment of the invention.

In the drawings:

Figure 1 is a vertical sectional view of a fragmentary portion of an internal-combustion engine, the illustrated valve drive train of which incorporates the mechanical lifter assembly comprising the present invention;

Figure 2 is a view partly in section, taken along the line 2—2 of Figure 1, this view illustrating particularly the means for preventing rotary motion of the axially movable plunger member of the lifter assembly;

Figure 3 is an enlarged view, partly in section and broken away, of the lifter assembly per se;

Figure 4 is a horizontal sectional view taken on the line 4—4 of Figure 3, which particularly illustrates the cooperative disposition of a circular series of spherical elements and associated raceways;

Figure 5 is a horizontal sectional view taken on the line 5—5 of Figure 3, and particularly presenting the slot construction for the reception of the inturned upper end of the expansible helically wound coil spring of the invention; and Figure 6 is a horizontal sectional view taken on the line 6—6 of Figure 3, this view illustrating clearly the slot construction for the reception of the inturned lower end of said helically wound spring.

Referring to the drawings, and with attention directed especially to Figure 1, the preferred embodiment of my invention is shown incorporated in a conventional internal-combustion engine, illustrated fragmentarily and designated by the numeral 8. The engine selected for illustrative purposes is of the well known V-type, and includes a plurality of valves, one of which is portrayed at 10. The poppet valve 10 surmounts an integral stem 12 slidably mounted in a bushing 14, and a relatively heavy compression spring 16, interposed about said stem between said bushing and a spring seat 18, normally biases the valve 10 to the closed position thereof illustrated, as is well understood.

The valve structure thus far described is typical and conventional, as is the engine camshaft 19 and its cam 20. Said cam includes a shaft concentric semi-circular portion 22 and a lobe portion 24.

The mechanical valve lifter assembly comprising the present invention is designated as a whole by the numeral 26, and is slidably interposed between the terminal end 28 of the valve stem and the cam 20 in a conventional cylinder 30 of the engine 8.

The lifter unit or assembly 26 includes a cup-shaped piston member 32, having a bottom wall 34 which at all times contacts the cam 20 as will appear, and a cylindrical side wall 36 reciprocable in the cylinder 30. A threaded socket 38 surrounded by an upstanding annular flange 40 is integrally formed with said bottom wall for the reception of the reduced depending threaded shank portion 42 of a plug member 44, the body portion 46 of said plug having formed in its peripheral surface a longitudinal slot 48 as shown.

Adjacent its upper end, the piston wall 36 has formed therein an annular internal recess or groove 50 to receive a split retainer ring 52 the specific function of which will be explained hereinafter. Also formed in the internal cylindrical surface of wall 36, and extending downwardly from the top marginal edge 54 of said wall, is a plurality of arcuately contoured angularly disposed raceways 56, three raceways being exemplarily shown as Figure 4 demonstrates.

As will be more explicitly explained further on, each of these raceways 56 cooperates with one of a circularly spaced series of three spherical elements or balls 58, whereby to automatically perform important functions in the operation of the valve lifter, as will be hereinafter explained.

Each of the balls 58 is seated in a substantially semi-circular socket or recess 60 provided in an axially motivatable clutch sleeve 62 slidably mounted in the piston 32, as seen to best advantage in Figure 3. Said figure also demonstrates the cross-sectional configuration of the aforesaid clutch sleeve, which is provided with an annular upwardly flaring or conical facing 64 of an inherently high frictional coefficient material. A facing 64 of bronze or brass for example is considered ideal.

Numeral 66 indicates generally a helically wound coil spring the convolutions of which engage each other and are normally disposed contiguous to, but not in frictional engagement with, the inner cylindrical surface of the piston wall 36. That is to say, the external peripheral surfaces of the coil convolutions normally have a sliding fit in the piston member 32.

As clearly depicted in Figure 3, the upper and lower edges of adjacent convolutions are contiguousy disposed, and the spring 66 surrounds, in annularly spaced relation thereto, the depending tubular segment 68 of a plunger generally designated 70 in Figure 3. At its upper end, the tubular segment 68 merges into a clutch segment 72, the peripheral contour of which corresponds to that of the clutch facing 64 for cooperation therewith, as will appear.

Surmounting the clutch segment 72, the plunger 70 is provided with an integral circular flange segment 74 in slidable disposition relative to the inner cylindrical surface of piston wall 36, and said plunger terminates at its upper end in a polygonal valve stem engaging segment 76, as exemplarily illustrated.

Means are provided to prohibit rotary movements of the plunger 70. To this end, and with attention directed to Figure 2, a keeper in the form of an angle bracket 78 is secured at one end thereof, as by a cap screw 80, to the upper face of the engine cylinder 30. The short leg 82 of bracket 78 engages a flat boss on the cylinder body as shown, and the long leg 84 projects diametrically across the bore of said cylinder in slightly elevated disposition thereto. A polygonal opening 86 is provided in the long leg 84 for the slidable reception of the polygonal segment 76 of the plunger.

As should be manifest from an inspection of Figure 3, the plunger 70 is biased upwardly to all times maintain the segment 76 in engagement with the lower end 28 of the valve stem by means of a compression spring 88. The spring 88 is confined within the bore of tubular plunger segment 68 between the end wall 90 of said bore and the plug member 44.

Reverting now to the clutch sleeve 62, the disengaged position thereof is portrayed in Figure 3, wherein said sleeve is seen to rest on the circumferentially projecting face portion of a split retainer ring 92 which is seated in an annular recess or groove 93 formed externally in the tubular segment 68 as illustrated. The ring 92 has a dual role in the operation as will be seen.

Both the upper and the lower ends of the helically wound spring 66 terminate in inturned hook portions whereby said spring is anchored to the plunger 70 at the top, and to the plug 44 at the bottom. As a comparison of Figures 5 and 6 demonstrates, the upper hook end 94 is of less length than the hook 96 formed on the lower end of said spring.

Numeral 98 designates a longitudinal slot provided in the tubular segment 68, which slot extends downwardly from a plane slightly above the annular groove 93 a sufficient distance to accommodate the reception of the helical spring hook portion 94. Said hook 94 extends into the slot 96 to thus anchor spring 66 at the top, it being noted however, that the retainer ring 92 serves as an abutment to prohibit longitudinal movements of the hook 94 in said slot.

A rotational clearance opening 100 is provided in the lower end portion of the tubular segment 66. The hook 96 extends through said opening and into the longitudinal slot 48 of the plunge 44, to thus anchor spring 66 at the bottom, it being noted however, that the length of slot 48 accommodates vertical movements of hook 96 therein.

Prior to entering into a detailed description of the manner in which the invention operates, a few general observations will be given as follows:

Thus, although Figure 1 illustrates the present valve lifter installed in a V-type engine, it is to be understood that such showing is exemplary only, since obviously the invention may be incorporated in other types of poppet valve controlled internal-combustion engines.

The illustrated embodiment of the invention includes three arcuately contoured angularly disposed raceways 56. The angularity of these raceways is preferably 15° substantially with respect to a vertical line of force passing through the balls 58. Further as Figure 3 demonstrates, said raceways have a slight spiral configuration.

With reference to the balls 58 which also play a dual role in the operation of the lifter mechanism as will appear, it should be noted that these are freely rotatable. Said balls are so to speak, partially embedded in the clutch sleeve 62 in that, as Figure 4 demonstrates, substantially sixty percent of each ball is disposed in one of the sleeve sockets 60.

It is also noted that although not discernible in Figures 1 and 2, it is to be understood that minute clearance obtains between the opening 86 in the keeper bracket 78 and the polygonal valve-stem engaging segment 76 of the plunger 70.

With respect to the split retainer ring 92, it should be noted that said ring is instrumental in maintaining the conical face of the clutch segment 72 and that of the clutch sleeve facing 64 in the same spaced relation whenever a clutch-disengaged status obtains.

The opening 100 is dimensioned to accommodate rotary movements of the inturned or hook portion 96 of the helical coil spring 66, it being noted that the rotary-wise movement of said spring is relatively slight as will be explained.

Since the cylinder 30 opens into the crankcase, the lifter assembly is amply lubricated at all times. If desired, a number of ports 102 as suggested in the drawing, may be provided in the bottom and in the side wall of the piston member 32 to derive oil from the crankcase for lubrication of the lifter unit.

The lifter assembly 26 has been designated a self-contained unit because the retainer ring 52 maintains the included elements in assembled relation to facilitate installation of the unit in cylinder 30. This arrangement obviously also facilitates removal of the lifter unit for repair should that become necessary, for example to remove a worn clutch facing 64 and replace it with a new one. Incidentally, it is noted that when the unit is not in operative disposition, the compression spring 88 expands to raise the plunger and all of its directly associated elements until the circular flange 74 engages against said ring 52, the longitudinal slot 48 accommodating axial movements of the helical coil spring lower inturned end 96.

Operation

It will be assumed that Figure 1 exhibits an exemplary cold engine status wherein the valve 10 is in seated or closed disposition, and wherein the camshaft 19 is at rest with the bottom wall 34 of the lifter assembly 26 in positive engagement with the concentric portion 22 of the cam 20. It will also be assumed that at this time, a negligible or unobjectionable degree of tolerance or operational clearance may be existent between the camshaft and the valve seat. It will further be assumed that when the engine is in operation, the camshaft revolution is counterclockwise as indicated by the directional arrow appearing in Figure 1.

In the cold engine status of the valve operating mechanism, the elements included in the lifter assembly 26 are disposed relatively to one another as illustrated in Figure 3 in consequence of the counter-biasing forces exerted by the valve spring 16 and the lifter spring 88.

It will now be assumed that the engine is energized, so that the camshaft 19 begins to rotate counterclockwise. During the initial one-half revolution thereof, the concentric portion 22 of cam 20 rides along the undersurface of the lifter piston bottom wall 34, in consequence of which the Figure 3 status of the lifter mechanism and therefore the Figure 1 status of the valve mechanism remains unchanged. However during the next quarter revolution, the non-concentric lobe portion 24 incrementally elevates the piston 32 as should be manifest.

The normal disposition of the clutch facing 64 relative to the clutch segment 72 is maintained by the split ring 92. In the interest of clarity, a clearly visible annular space appears to obtain between said facing and segment in Figure 3. However it is to be definitely understood, that no perceptible clearance is actually present. In other words, the normal relative disposition of these elements may be said to provide a "slip-action" clutch arrangement.

Continuing with the operation, during the initial stage of the incremental elevation of the piston member, the upward thrust impact is transmitted from the piston member, via the raceways 56, to the balls 58 to thus instantaneously effect clutch engagement between the facing 64 of sleeve 62 and segment 72 of the plunger. Simultaneously with clutch engagement, or at least so quickly thereafter as to beggar description, the incremental upward advance of the piston member 32 is accompanied by a slight counterclockwise rotation thereof, whereby to uncoil or unwind the helical spring 66 into frictional engagement with said piston, whereupon all of the elements included in the lifter assembly 26 advance in unison aspect to open the valve 10.

It is believed apropos at this time to elaborate in more detailed fashion on the action and resultant disposition of the lifter elements recited in the immediately preceding paragraph. It will be remembered that the normal relation obtaining between the outer peripheral surfaces of the helical coil convolutions and the piston wall 36 has been described as being equivalent to a sliding fit. Therefore, the initial minute axial upward thrust of the piston 32 transmits through the raceway and ball connections a corresponding axial thrust of the clutch sleeve 62 whereby to frictionally lock said sleeve to the plunger 70. Instantaneously following this locking effect or clutch engagement, the ball and raceway connections convert the axial movement of said piston into counterclockwise spirally rotative movement, as viewed in Figures 5 and 6. As a result, the plug 44 also rotates similarly whereby to unwrap or expand the helical spring 66 into frictional contact with the piston wall. As the spring 66 unwinds, the upward thrust force is transmitted via the contiguously disposed convolutions of said spring to the split ring 92 for equal distribution as the locking effect previously referred to is being consummated.

From the foregoing it should be manifest that the invention provides an ingenious disposition and inter-relation of elements adapted to automatically adjust themselves into a rigid assembly for operating the valve stem 12 against the force of spring 16, whereby to dispose the valve 10 in fully open position as the apex of cam portion 24 passes the central region of piston member bottom wall 34.

Now as the camshaft 19 continues to revolve, the compressed spring 16 expands to fully seat valve 10 and return the lifter unit and its included elements to their normal relaxed positions exhibited in Figure 3, for a repetition of the next valve opening cycle. In the course of this final quarter revolution substantially of the camshaft which includes the closing ramp and a base circle portion of cam 20, the oppositely biasing force of the compression spring 88 is effective following full seating of the valve 10 which relaxes the parts of the lifter unit, to restore the operating clearance between the outer piston member 32 and the inner plunger member 70 requisite for the raceway and ball connections 56, 58 to function upon the inauguration of the next valve opening cycle. During relaxation of the parts as aforesaid, the helical locking spring 66 instantly contracts to unlock the lifter members 32, 70 and in so doing supplements the action of the compression spring 88 to automatically adjust the valve drive train to compensate for any backlash that may be existent during valve closure and also to assist the operating clearance restorative action of the compression spring 88.

Further considering the operational behavior of the present valve lifter invention, it is desired to place emphasis with clarifications on the nature of the predetermined relative movement or operating clearance obtaining between the outer body member 32 and the inner body member 70 requisite to effecting operation of the spring locking or clutching means 66, whereby the two body members function as a rigid assembly in opening and closing a selected engine valve. This relative movement is characterized by a helical or spiral path of limited extent induced, for example, by a series of interengaging balls 58 and complemental spirally generated raceways 56 carried by the clutch sleeve 62 and outer member 32 respectively, best demonstrated in Figures 1, 2, and 4. To facilitate commercial adaptation of the novel principles inherent with the present invention, it is desired to expressly point out that while initial lift of the outer member 32 responsive to rotation of the engine-drive cam 20 may, due to spaced disengagement of the clutch sleeve 62, follow a straight line of infinitesimal extent and correspondingly move the sleeve aforesaid into clutching engagement with its complemental clutching surface 72 on the inner body member, before relative spiral movement occurs responsive to the interaction of the ball and raceway connections aforesaid, it will be appreciated, however, that use of the expression "spiral relative movement" is intended to embrace such limited straight line or axial movement as may occur, since under actual operating conditions initial urge of the lifter assembly 26 in a valve opening direction would be so rapid that a defined axial relative movement would be prohibitive as separate and distinct from the ensuing spiral movement requisite for operativeness of the present disclosure. Therefore, in the practical application of the present valve tappet, the spiral relative movement of the outer body member with respect to the inner body member to effect locking the two members together for conjoint movement to open a selected engine valve, should be considered as the normal relative function of the members to radially expand the spring 66 responsive to engagement of the friction clutch elements 62, 72 to frictionally lock the members together for the purpose.

Considering the terminology used in the foregoing description and in the appended claims, the identifying expressions and/or terms employed are intended to convey meanings which include the range of reasonable equivalents in the patent sense. For example, the expressions "wear," "backlash," and "lost-motion" are intended to convey similar meanings with respect to excessive idle travel within the valve drive gear, while such expressions as "operating clearance," "limited relative movement," etc. relate to the operating movement in the lifter mechanism as is understood. The terms "upper," "upward," "lower," "outer," "inner," "bottom," "vertical," and other directional words or characters are intended to have only relative connotation for convenience in describing the structure as illustrated in the drawings, and are not intended to be interpreted as requiring any special orientation with regard to associated structure external to the present disclosure.

From the preceding description augmented by an inspection of the drawing, it is believed that a comprehensive understanding of my invention may be had. However, it is to be understood that the precise details of structure illustrated and described shall not be construed in a limiting sense, the invention contemplating all modifications or substitutions of equivalent structure which may fall within the purview of the following claims.

I claim as my invention:

1. A valve lifter reciprocably interposed in a cylinder between a selected valve and a cam on the camshaft of an internal-combustion engine, said lifter including: a piston member actuatable by said cam, said member having a cylindrical longitudinal bore closed at one end and open at the other; a plunger slidably mounted in the cylindrical bore of said piston, said plunger terminating at its upper end in an extension for operatively acting on the end of the stem of said valve; preloaded spring means operably interposed between the piston and plunger to bias them apart; means for converting limited axial movement of said plunger relative to the piston member into minute relative rotating movement therebetween; and helically wound coil spring means operably disposed between said plunger and piston member normally accommodating relative movement therebetween and radially deformable for effecting a temporary interlock between the aforesaid piston member and plunger responsive to rotational movement aforesaid induced by the initial cam-actuated lift axial movement of said piston member to open said valve.

2. The valve lifter set forth in claim 1, and means for maintaining the recited structure in assembled operative relation at all times to provide a self-contained unit, said means comprising a split retainer ring seated in an annular groove provided in said piston member adjacent the open end thereof, the inner peripheral portion of said ring overlying the spring supported plunger.

3. In a self-contained valve lifter unit reciprocably interposed between the end of a valve stem and the camshaft of an internal-combustion engine: an axially movable but non-rotatable plunger for actuating said stem to intermittently open and close the valve; means for automatically maintaining substantially zero-clearance between said plunger and stem irrespective of expansional and contractional variations existent in consequence of thermal conditions of said engine; a cup-shaped piston member wherein said plunger is confined between a plug member rigidly mounted centrally in the end wall and a split retainer ring mounted in an internal annular recess adjacent the open end of the cylindrical side wall of said piston; an expandible helical coil spring having an operative connection between said plunger and piston for effecting a temporary unison movement of them in the course of opening said valve; means operably effective between the piston and plunger for inducing limited relative spiral movement of the piston with respect to the plunger, responsive to initial lift movement of the piston; and friction clutch means having an element movable into engagement with the plunger responsive to the last-mentioned means, whereby said spiral movement is effective to expand the coil spring for the purpose.

4. The self-contained valve lifter unit set forth in claim 3 in which the friction clutch means comprise: a conical clutch segment integral with said plunger; a complemental clutch sleeve normally maintained in minutely spaced relationship to said segment; a plurality of circularly spaced ball elements partially embedded in the periphery of said sleeve; and a like plurality of angularly disposed raceways for said ball elements formed in the inner cylindrical surface of the piston member for first axially moving said sleeve into clutching engagement with said clutch segment responsive to axial movement of said piston member, and for instantaneously thereafter converting the said axial movement of the piston member into relative spiral movement thereof whereby to unwind the recited helical coil spring.

5. The self-contained valve lifter unit set forth in claim 3, wherein the recited axially movable but non-rotatable plunger comprises integrally: a tubular segment merging at its outer end into a conical clutch segment; a circular flange segment surmounting the clutch segment; a polygonal segment projecting from the flange segment; an annular groove in the tubular segment for the reception and retention of a split retainer ring; and a rectangular opening adjacent the opposite end of said tubular segment.

6. The self-contained valve lifter unit set forth in claim 3, wherein the means for automatically maintaining substantially zero-clearance between the plunger and stem comprises a preloaded compression spring interposed in the bore of a depending tubular segment of said plunger between the recited plug member and the end wall of said bore.

7. A mechanical valve lifter including: a cup-shaped piston reciprocable in a cylinder of an internal-combustion engine responsive to the rotation of the engine camshaft, said piston having a flat end wall and a cylindrical side wall; a threaded socket formed centrally in said end wall for the reception of the depending reduced threaded shank portion of a cylindrical plug member; a longitudinal slot formed in the external periphery of said plug member; a plunger member slidable in said piston and including a depending tubular segment the inner end portion of which surrounds said plug member; a preloaded compression spring interposed in the bore of said tubular segment between the top of said plug and the end wall of the bore for biasing the plunger relative to the plug; a longitudinal slot formed in the outer end portion of the tubular segment and a rectangular opening formed in the inner portion thereof; a helically wound coil spring disposed about the tubular segment in annular spaced relation thereto, the adjacent convolutions of said spring being in contacting relation and having their outer peripheral surfaces normally in slidable engagement with the inner periphery of the cylindrical side wall; an inturned terminal hook on one end of said helically wound spring for engaging in the aforesaid longitudinal slot formed in the outer portion of the tubular segment; an inturned terminal hook on the other end of said helically wound spring for engaging in the aforesaid longitudinal slot formed in the plug member, said hook extending through the rectangular opening in the inner end portion of said tubular segment; and means responsive to the initial lift movement of the piston for converting the axial movement thereof into relative spiral movement whereby to radially expand the helical spring convolutions into frictional engagement with the cylindrical side wall of said piston.

8. In a mechanical valve lifter of the character described: a cup-shaped piston reciprocable responsive to the rotation of a cam on the camshaft of an internal combustion engine; a spring supported plunger slidably mounted in the piston for limited axial but non-rotational movements therein; a conical clutch segment on the plunger; a clutch sleeve having a conical facing of an inherently high frictional coefficient material for engaging the clutch segment; means mounted on the plunger for normally maintaining the clutch sleeve facing in predetermined minutely spaced relation relative to the clutch segment; a plurality of circularly spaced spherical elements partially embedded in the clutch sleeve; a like plurality of angularly disposed arcuate raceways in the piston for cooperating with the spherical elements to effect clutch engagement and disengagement responsive to the reciprocations of said piston; and a spring normally relaxed and deformable into tensioned condition between the piston and plunger for effecting frictional locking engagement thereof responsive to said relative spiral movement of the piston induced by engagement of said clutch segment and sleeve.

9. In a mechanical valve lifter of the character described: the structure recited in claim 8, and means for accommodating the axial but non-rotational movements of said plunger, said means comprising a polygonal segment integral with and projecting above the main body of the plunger, and a stationary keeper bracket provided with a corresponding polygonal opening for the slidable reception of said polygonal segment.

10. In a mechanical valve lifter of the character described: the structure recited in claim 8 wherein the means for normally maintaining the clutch sleeve facing in predetermined minutely spaced relationship with the clutch segment comprises the circumferentially projecting portion of a split retainer ring seated in an annular peripheral groove formed in a tubular segment of the plunger subjacently to said clutch segment.

11. In a mechanical valve lifter of the character described: the structure recited in claim 8 in which the helically wound coil spring is anchored at one end to the plunger and at its other end to the piston, the edge portions of adjacent convolutions of said spring being contiguously disposed, and the peripheral surfaces of said convolutions being normally disposed contiguous to but not in frictional engagement with the inner cylindrical surface of said piston.

12. In a mechanical valve lifter of the character described: the structure recited in claim 8 wherein the angularity of each raceway is substantially 15° with respect to a vertical line of force passing through its complemental spherical element, and wherein each raceway has a slight spiral configuration to induce a corresponding relative movement of the piston with respect to the plunger.

13. A mechanical valve lifter including in assembly: a cup-shaped piston reciprocable in a cylinder of an internal-combustion engine responsive to the rotation of the engine camshaft, said piston having an end wall and a cylindrical side wall; a threaded socket formed centrally in said end wall; a plug having a reduced threaded shank portion for engaging said socket; a longitudinal slot formed in the peripheral surface of the plug and extending approximately from end to end thereof; a plunger slidably mounted in said piston and including integrally a tubular segment merging into a conical clutch segment, a circular flange segment surmounting the clutch segment, and a polygonal segment projecting above the flange segment; means cooperating with said polygonal segment for accommodating axial but preventing rotary movements of said plunger; a compression spring interposed in the bore of said tubular segment between said plug and the end wall of said bore for biasing the plunger in a direction away from the plug; a clutch sleeve; and means associated with the plunger for normally supporting said sleeve in minutely spaced relation relative to said conical segment of the plunger; complemental ball and raceway means for moving the clutch sleeve into clutching engagement with said conical segment; an expansible helically wound coil spring interposed in the piston about the tubular segment, said spring terminating at one end in an inturned hook portion to engage a longitudinal slot formed in the tubular segment, and at its other end in a similar hook portion to engage in the longitudinal slot of said plug; and a clearance opening through which said last-named hook portion extends provided in the tubular segment for accommodating slight rotative movements of the plunger aforesaid relative to said other end hook portion of the helical coil spring.

14. A valve lifter mechanism comprising: a pair of relatively movable body members, biasing means disposed between said members for accommodating relative adjustments therebetween, friction clutch means operatively incorporated between said members, spring locking means operatively connected to both of said members for frictionally locking said members together in response to operating said clutch means into clutching engagement with one of said members induced by limited relative spiral movement between said members, and means operably interconnecting said clutch means and other member for generating said spiral movement responsive to initial movement of said other member.

15. A valve lifter mechanism for use in a valve drive train for opening and closing a valve of an engine comprising: a pair of body members movable relatively to each other and adapted for incorporation in said valve drive train, preloaded spring means between said members for accommodating relative adjustments therebetween to establish zero clearance substantially in the valve drive train in the closed position of the engine valve, engine-driven cam means for operably engaging one of said members for opening said engine valve, friction clutch means operably incorporated between said members, spring clutching means operatively connected to both of said members for clutching them together for conjoint movement to open said engine valve in response to operating said clutch means into clutching engagement with the other of said members induced by limited relative spiral movement between said members, and means operably interconnecting said clutch means and one member for generating said spiral movement when said one member is initially moved by said cam means.

16. In an internal-combustion engine in combination with a camshaft and valve mechanism: of a tappet body comprising an outer body member having a bore therein, and an inner body member reciprocably disposed in the bore of said outer body member; a pretensioned spring interposed between said body members tending to separate the same; a deformable helically generated spring operatively connected to both of said body members for transmitting axial thrust therebetween and circumferentially disposed about said inner body member in frictional engaging contact with the surface of the bore of the outer body member; friction clutch means having a movable element operatively connected to the outer body member for cooperating with a frictional surface carried by the inner body member; and means responsive to camshaft actuation of said outer body member at the inauguration substantially of the lift portion of the tappet cycle, for simultaneously effecting incremental axial and rotational movements of said outer body member relatively to said inner body member to operate said friction clutch means into locking engagement with said frictional surface, causing said helical spring to deform into frictional locking engagement with the surface of the bore of the outer body member, thereby interlocking said body members together for conjoint movement to operate said valve mechanism to open position.

17. In an internal-combustion engine having a camshaft and valve mechanism: the structure recited in claim 16 in combination with means secured to a portion of the engine in operative engagement with the inner body member for preventing rotational movement thereof.

18. In a mechanical compensating tappet for valves of internal-combustion engines including a cam-actuated tappet body having a longitudinal cylindrical bore closed at one end and open at the other: a plunger reciprocably mounted in said bore and provided with a clutching surface adjacent its outer end; means effective between the tappet body and plunger for limiting axial displacement of the plunger; preloaded spring means for axially elongating the tappet body and plunger relatively to each other; a movable clutch element having a complemental clutching surface in confronting relation to the clutching surface on the plunger for engagement therewith; means for maintaining the clutch element when disengaged in predetermined spaced relation with respect to the clutching surface on the plunger; means operably incorporated between the tappet body and clutch element for imparting limited relative axial and rotational movements to the tappet body with respect to the plunger whereby the clutch element is operated to clutch the plunger responsive to relative axial movement aforesaid of the tappet body during the initial lift portion of the tappet cycle; and spring locking means operably interconnecting the tappet body and plunger for locking the body and plunger together responsive to relative rotational movement aforesaid of said tappet body to open the engine valve.

19. The mechanical compensating tappet set forth in claim 18, in which the spring locking means comprise a normally unloaded solid helical twist spring having inturned ends operatively engaging the tappet body and plunger respectively, with the outer peripheral spiral surface generated by the engaging coils thereof disposed in slidable engagement with the longitudinal cylindrical surface of the tappet body bore whereby relative rotational movement aforesaid is effective to radially expand the overall length of the spring into frictional locking engagement with said tappet body surface to interlock the tappet body and plunger.

20. In a mechanical compensating tappet comprising, in combination, a pair of relatively movable interfitting body members, biasing means disposed between said members to accommodate relative adjustments therebetween, spring clutching means effective under tension to frictionally clutch said members together for conjoint movement, and means operably interconnecting the members for generating a helical path of limited relative movement of one member with respect to the other member responsive to initial movement of said one member.

References Cited in the file of this patent

UNITED STATES PATENTS

| | | |
|---|---|---|
| 1,441,248 | Short | Jan. 9, 1923 |
| 2,119,096 | Buckley | May 31, 1938 |